United States Patent
Giardina et al.

[11] Patent Number: 6,088,325
[45] Date of Patent: Jul. 11, 2000

[54] ASYMMETRICAL ENCODING/DECODING METHOD AND APPARATUS FOR COMMUNICATION NETWORKS

[75] Inventors: Charles R. Giardina, Mahwah; Ashok N. Rudrapatna, Basking Ridge, both of N.J.

[73] Assignee: AT&T Corp., New York, N.Y.

[21] Appl. No.: 08/987,489

[22] Filed: Dec. 9, 1997

[51] Int. Cl.$^7$ .............................. H04J 11/00; H04B 7/216; H04B 15/00
[52] U.S. Cl. ................. 370/207; 370/342; 370/479; 375/200; 375/210
[58] Field of Search ......................... 370/203, 206, 370/207, 342, 479; 375/200, 202, 206, 208, 209, 210, 260, 262

[56] References Cited

U.S. PATENT DOCUMENTS

| | | | |
|---|---|---|---|
| 5,224,122 | 6/1993 | Bruckert | 375/202 |
| 5,325,394 | 6/1994 | Bruckert | 375/200 |
| 5,608,722 | 3/1997 | Miller | 370/203 |
| 5,691,974 | 11/1997 | Zehavi et al. | 370/203 |
| 5,790,591 | 8/1998 | Gold et al. | 375/206 |

*Primary Examiner*—Alpus H. Hsu
*Assistant Examiner*—Afsar M. Qureshi
*Attorney, Agent, or Firm*—Kenyon & Kenyon

[57] ABSTRACT

In accord with the transmission system, encoded signals may be processed in intermediate stations and at receiving stations in an order different from the order of the original encoding process for transmission. In particular, the recovery of CDMA encoded signals does not require application of spreading/despreading codes in the original scheme or sequence of application of spreading codes. In one embodiment, code applications may be permuted without losing the original signal which has been encoded. In such applications, not all of the encoding spreading functions results in an increased spreading rate.

5 Claims, 3 Drawing Sheets f — RECEIVED SIGNAL
G — INVERSE SPREADING FUNCTION
H — INVERSE SPREADING FUNCTION
C — CORRELATION OPERATOR

ASYMMETRICAL ENCODING/DECODING METHOD AND APPARATUS FOR COMMUNICATION NETWORKS

FIELD OF THE INVENTION

This invention relates to encoding/decoding of communication signals and in particular to sequences of code application to communication signals. It is particularly concerned with CDMA encoding and decoding of communication signals.

BACKGROUND OF THE INVENTION

Encoding signals in communication systems often requires the application of many codes in which a plurality of codes are applied to a signal as a sequence of overlays to accomplish several objectives in conditioning the signals to meet diverse signal transmission and switching objectives. Some encoding examples may include spreading and overspreading applied to create a CDMA signal optimized for transmission channels. Other code processes include error correction, signal correlations or de-correlations, etc.

These multiplicity of code applications must frequently be handled by a plurality of processing stations located between an originating and a terminating station. Normally the signal must be decoded and recoded at each processing station. This represents a considerable processing effort at each such station which leads to overall signal transmission inefficiencies.

In other transmission processes (i.e. CDMA), the signals may be spread or despread in several stages of successive processing stations. These processes may or may not alter the overall spreading rate dependent on the spreading processes. Spreading applications having successive layers of spreading are performed sequentially and if the original signal is to be recovered in an intermediate processing station the despreading for recovery is in reverse sequence and subsequent respreading is performed in the exact same sequence as the original spreading operation at the transmitter. Again the processing required may be instituted even though the recovery of the original signal is not needed and significantly reduce transmission efficiencies.

SUMMARY OF THE INVENTION

In accord with the invention, encoded signals, originating from transmitting stations, may be processed in intermediate stations and at receiving stations in an order different from the order of the original encoding process in order to facilitate switching, multiplexing, demultiplexing, signal regeneration, etc. In particular, the recovery of CDMA encoded signals does not require application of spreading/despreading codes in accordance with the reverse order of the original encoding order scheme or sequence of application of spreading codes. This is true for various classes of spreading in all direct sequence methods in instances using codes in which correlation despreading is employed. Moreover with like classes of code for other applications such as frequency hopping, time hopping, etc. may also be permuted.

In the illustrative embodiment, code applications may be permuted without losing the original signal which has been encoded. In such applications, not all of the encoding spreading functions result in an increased spreading rate. In theory, the permuting of code applications is predicated on the allowability of permuting the order of interated Lebesgue integrable functions while retaining the original values.

In a particular illustrative example, a particular sequence of application of despreading codes of a received signal is permuted from that of the original application of spreading codes at signal transmission. A plurality of signal processors may assume varied sequences while retaining the original signal values.

DETAILED DESCRIPTION

Figure 1:
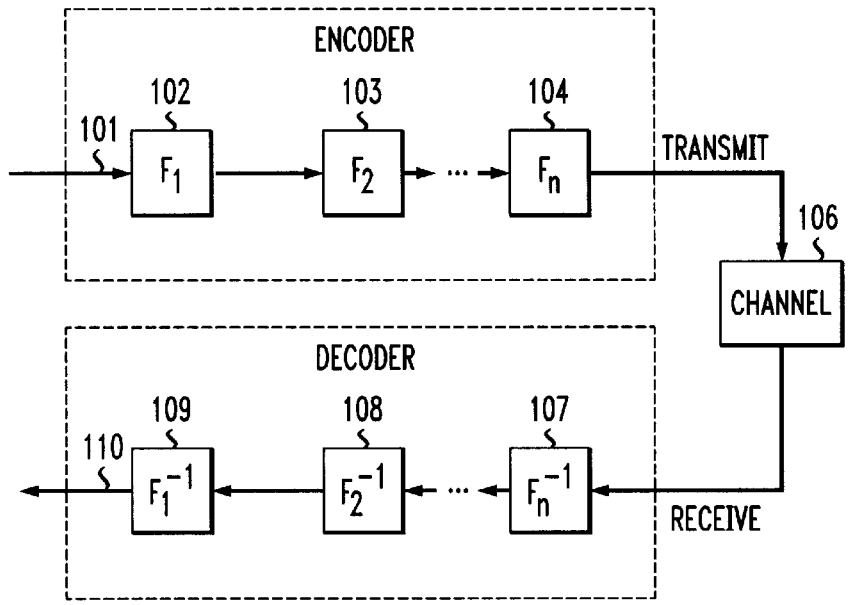
FIG. 1 is a block schematic of a traditional prior art communication system using spread CDMA signals where decoding at the receiver is performed in a reverse symmetrical order of the encoding prior to transmission.

In a conventional communication system, decoding of received CDMA signals is an exact reverse symmetrical order of the initial coding for transmission. A communication system using such conventional coding arrangements is shown in FIG. 1 and includes an input 101 for accepting signals for transmission followed by three encoder functions 102, 103 and 104 providing the spreading functions $F_1$, $F_2$ through $F_n$. The encoded signal is transmitted through a channel 106, which may be wired or wireless, to a receiving location having a plurality of decoders 107, 108 and 109 and an output 110. The decoders each provide an inverse decoding function. The decoding functions, $F_n^{-1}$ through $F_2^{-1}$ and $F_1^{-1}$, are provided in an exact reverse sequence order of decoding to the initial sequence of coding order. This requires that decoding for any process must be recovered in a number of steps needed to traverse the reverse symmetrical order of coding. The encoding and decoding circuitry is well known in the art and it is not believed to disclose the same in detail.

Figure 2:
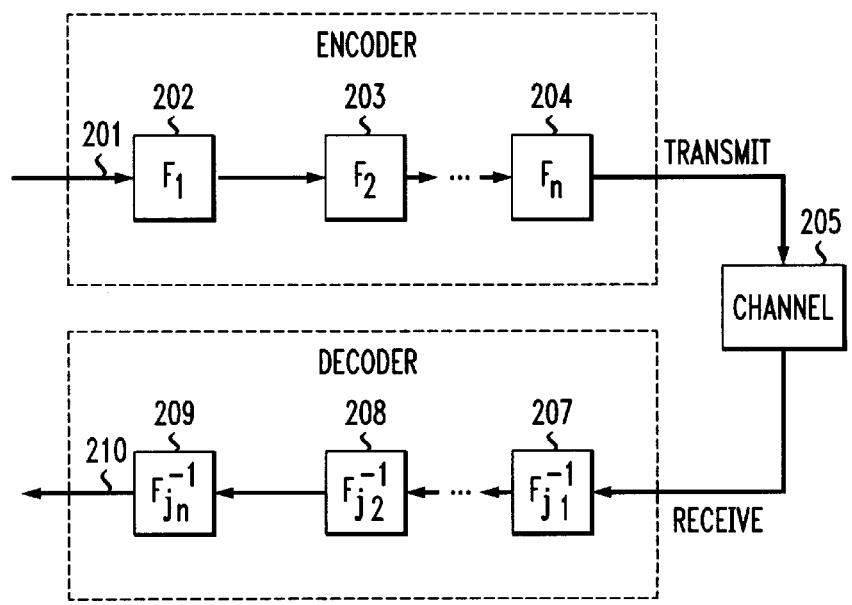
FIG. 2 is a block schematic of a communication system using spread CDMA signals with decoding at the receiver using despreading functions in an order not consistent with a reverse symmetrical order of the encoding prior to transmission.

A system in which the spread spectrum decoding may be permuted is shown in the communication system of FIG. 2. In this instance a certain class of spreading functions is used which support the change in sequence between spreading and despreading. Initially a signal applied to input 201 is encoded by encoders 202, 203 and 204 by the spreading functions $F_1$, $F_2$ and $F_n$, in that order. Not all of the spreading codes applied need result in increased spreading rates.

The spread CDMA signal is transmitted through a channel 205 to a receiver having the decoders 207, 208 and 209 serially connected to output 210. The decoding functions $F_{j1}^{-1}$, $F_{j2}^{-1}$ and $F_{jn}^{-1}$ are not connected in the sequential reverse order of the encoding functions at the transmit end. However for every encoder $F_i$ there is a corresponding decoder $F_{jk}$. In this arrangement coded signal units are separately recoverable at all levels of encoding. This change in order permits the extraction if needed of a certain level of the encoded signal for processing functions.

Figure 6:
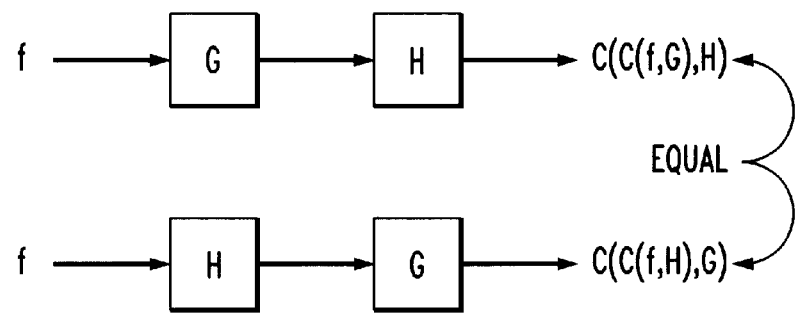
FIG. 6 is a block schematic illustrating invariance of correlated encoding and decoding functions.

The basis for permutation of correlation code and decode orders is the Tonelli-Hobson theorem. This theorem governs permuting of the order of iterated integrals for Lebesgue integrable functions. It is expressed as the following result.

$$C((f,G),H)(t) = C(C(f,H),G)(t)$$

Where f is a received signal, G is an inverse spreading function, H is an inverse spreading function and C is a correlation operator. The permutation for one correlation operator is shown graphically in FIG. 6 which shows the invariance of inverse spreading function G followed by H with its equivalent H followed by G.

Figure 3:
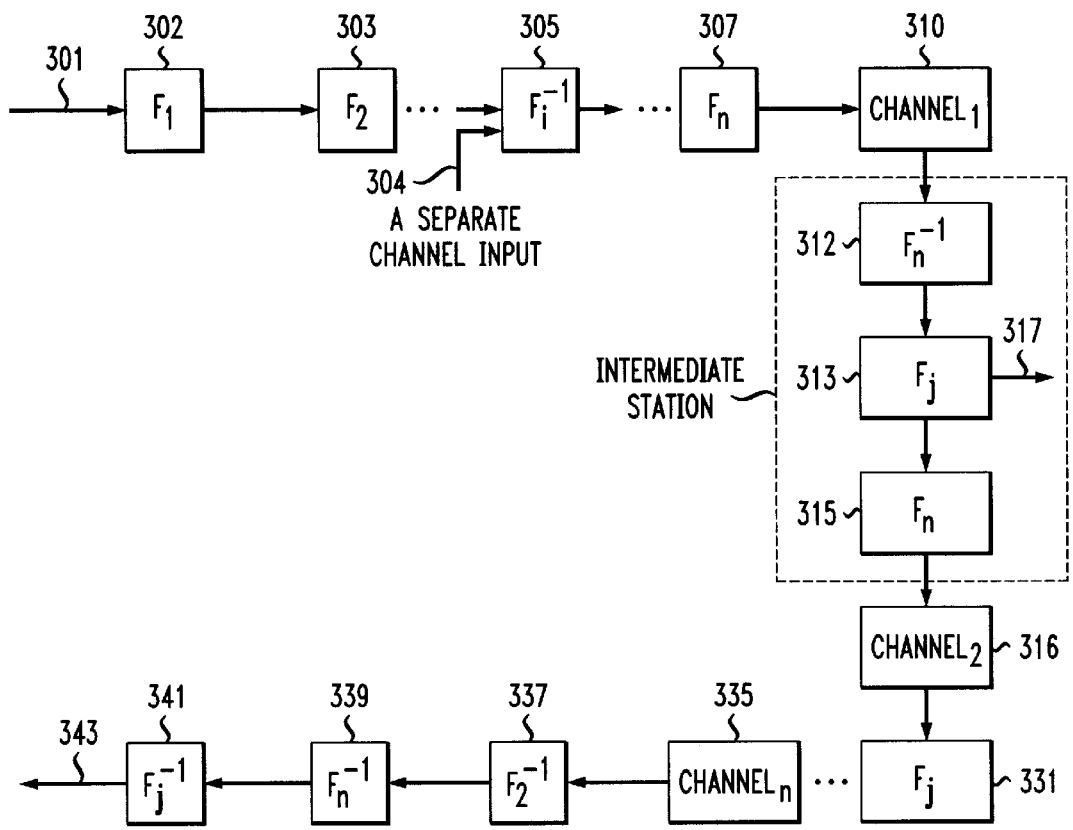
FIG. 3 is a block schematic of a generalized communication system using direct sequence CDMA with permuting of inverse decoding operations in intermediate decoders and in a receiving decoder.

A frequent occurrence in transmitting encoded signals is the need to decode the signal to some intermediate level of coding for processing at an intermediate point or waystation in the overall transmission path. An illustrative transmission system requiring such processing is shown in the FIG. 3. A signal to be transmitted is applied to input 301 and spread encoded by the spread codes $F_1$ and $F_2$ in the encoders 302 and 303. A subsequent encoder 305 receives another separate channel input and additionally further encodes the output of coder 302. The auxiliary channel is applied on lead 304. Both signals are encoded in coder 305 by applying the spreading code $F_i^{-1}$ to both signals. These signals are transmitted to a subsequent spreading decoder 307 for application of spreading code $F_n$ before transmission over the channel$_1$ 310.

An intermediate station includes the decoder 312 for application of despreading code $F_n^{-1}$. A series of spreading encoders 313 and 315 are connected in series. These encoders apply spreading codes $F_j$ and $F_n$ for retransmission of the signal. Encoder 313 has a separate output 317 for transmission from an output of encoder 313.

The output of spreading encoder 315 is applied to the channel$_2$ 316 for transmission to another intermediate destination including a spreading encoder 331 applying the spreading code $F_j$.

The spread signal is transmitted via a transmission channels 335 to a series of despreading decoders 337, 339 and 341 applying the despreading codes $F_2^{-1}$, $F_n^{-1}$ and $F_j^{-1}$, respectively. The despread output signal is applied to output lead 343.

Figure 4:
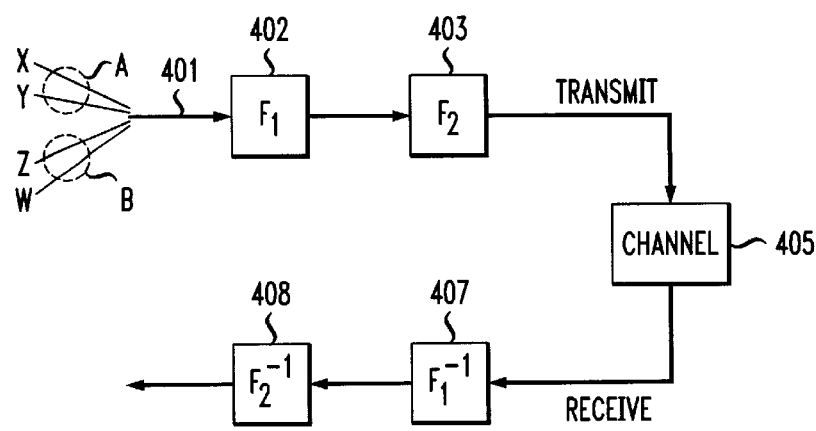
FIG. 4 is a block schematic of a communication system using direct sequence CDMA with permuting of inverse decoding operations in the receiving decoder.

An illustrative example of Direct Sequence CDMA with permuted inverse decoder operations is shown in the FIG. 4. The signal functions A and B are applied into the input at 401. A includes X and Y and B includes Z and W. These are applied to the successive encoding devices 402 and 403 having the encoding functions $F_1$ and $F_2$, respectively. A and B have different PN sequences, the A sequence being +, +, − and the B sequence being +, −, +. The encoded signals are transmitted by a channel 405 to a receiver including the decoders 407 and 408. The decoders are permuted from the conventional inverse sequence of the decoding process. In the spreading process, at the input the first four spreading Walsh functions for X, Y, Z and W are applied as $F_1$ at each clock pulse. These are known as the Walsh ON sequence. The applicable Walsh function is

| WALSH FUNCTION TABLE | | | | |
|---|---|---|---|---|
|  | 0 | 1 | 2 | 3 |
| X | + | + | + | + |
| Y | + | + | − | − |
| Z | + | − | − | + |
| W | + | − | − | + |

The illustrative time sequence coding is illustrated in the table below. The code repeats every 12 timing markers

| TABLE OF TIME SEQUENCE CODING | | | | | | | | | | | | | | |
|---|---|---|---|---|---|---|---|---|---|---|---|---|---|---|
| Pattern Repeats mod12 Time → | | | | | | | | | | | | | | |
|  | 0 | 1 | 2 | 3 | 4 | 5 | 6 | 7 | 8 | 9 | 10 | 11 | 12 | 13 |
| X | + | + | + | + | + | + | + | + | − | − | − | − | + | + |
| Y | + | + | − | − | + | + | − | − | − | − | + | + | + | + |
| Z | + | − | − | + | − | + | + | − | + | − | − | + | + | − |
| W | + | − | + | − | − | + | − | + | + | − | + | − | + | − |

Figure 5:
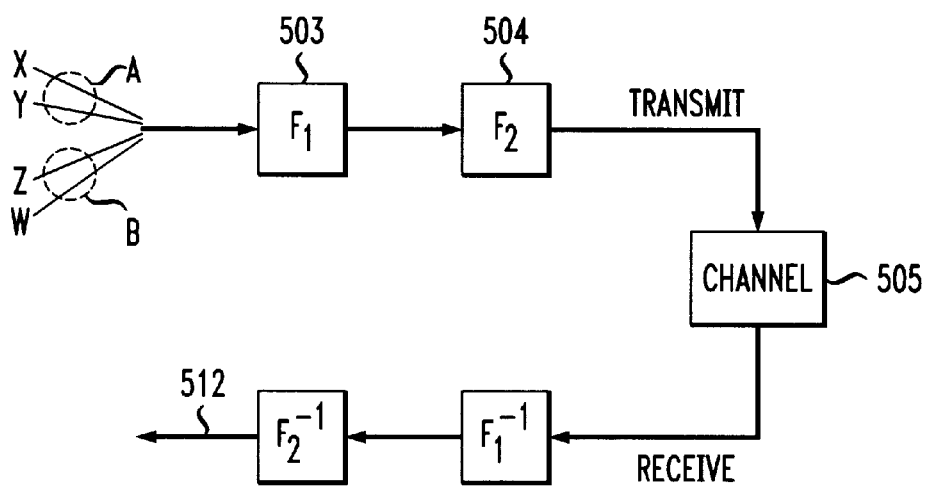
FIG. 5 is a block schematic of a communication system using frequency hopping CDMA with permuting of inverse decoding operations in the receiving decoder.

A particular illustrative embodiment concerning application of the permuting of coding as applied to a frequency hopping CDMA transmission system is shown in the FIG. 5. Four users (X, Y, Z and W) are depicted in a communication system. Two encoders 503 and 504 are shown with the encoding functions $F_1$ and $F_2$ to map the users on the hop set {x, y, z, w}. At any time the hop set as shown is (n x y z w). Application of encoding operator $F_1$ gives the hop pattern (n x y z w) for n being even and (n y x w z) for n being odd. $F_2$ has input of the form (n a b c d). In this embodiment n is congruent to k(mod4). So $F_2$ gives (n a b c d) for k=0 or 1. $F_2$ gives (n c d a b) for k=2 or 3. Hence $F_1 F_2$ gives (n x y z w) for k=0; $F_1 F_2$ gives (n y x w z) for k=1; $F_1 F_2$ gives (n z w x y) for k=2; and $F_1 F_2$ gives (n w z y x) for k=3. $F_1$ and $F_2$ are both involutions in that both are each equal to their inverse value and two successive applications results in identity. The transmitted frequency pattern (n a b c d) for n=0, 1,2,3 may be matched by applying first $F_1$ followed by $F_2$.

The system is controlled by a clock as is customary in CDMA systems. In function $F_1$, the clock frequency for X and Y is interchanged and the clock frequency for Z and W is interchanged for each clock pulse. In function $F_2$, every other of the clock pulse frequencies within A are interchanged with those within B. These frequency interchanges are indicated in the tables of values in FIG. 5. After transmission through channel 505, decoding is performed in a permuted order ($F_1^{-1}$ precedes $F_2^{-1}$) in the decoders 506 and 507, with full signal recovery of the output 512.

The operation of the illustrative embodiment of FIG. 5 may be ascertained by review of the accompanying tables A through D in FIG. 5. Table A indicates the encoding operations on the two groups of signals A and B to be frequency hopped by the encoded 503.

TABLE A

| | | | Repeats mod4 Time → | | | | |
|---|---|---|---|---|---|---|---|
| | 0 | 1 | 2 | 3 | 4 | 5 | ... |
| X | x | y | z | w | x | y | |
| Y | y | x | w | z | y | x | |
| Z | z | w | x | y | z | w | |
| W | w | z | y | x | w | z | |

The Xs and Ys of subgroup A are permuted as are Ws and Zs of subgroup B. Alternating output is created every clock pulse. These permutations are shown in the table A of FIG. 5. The output of coder 503 are further permuted by encoder 504 by permuting values of A and B every two time units as indicated in table B.

TABLE B

| | | | | Time → | | | | |
|---|---|---|---|---|---|---|---|---|
| | | 0 | 1 | 2 | 3 | 4 | 5 | ... |
| | X | x | y | x | y | x | y | |
| A | Y | y | x | y | x | y | x | |
| | Z | z | w | z | w | z | w | |
| B | W | w | z | w | z | w | z | |

The frequency hopped transmission is shown in the table C.

TABLE C

| | | | Repeats mod4 Time → | | | | |
|---|---|---|---|---|---|---|---|
| | 0 | 1 | 2 | 3 | 4 | 5 | ... |
| X | x | y | z | w | x | y | |
| Y | y | x | w | z | y | x | |
| Z | z | w | x | y | z | w | |
| W | w | z | y | x | w | z | |

At the receiver, the decoder 506 performs the inverse of $F_2^{-1}$ first which is out of order from the transmit operations. The X and Y signals are permuted and then Z and W with time units separately altered as in table D.

TABLE D

| | | 0 | 1 | 2 | 3 | 4 | 5 | ... |
|---|---|---|---|---|---|---|---|---|
| | X | x | x | z | z | x | x | |
| A | Y | y | y | w | w | y | y | |
| | Z | z | z | x | x | z | z | |
| B | W | w | w | y | y | w | w | |

The A and B subgroups are permuted every two time units producing results as shown in the table E

TABLE E

| | | 0 | 1 | 2 | 3 | 4 | 5 | ... |
|---|---|---|---|---|---|---|---|---|
| | X | x | x | x | x | x | x | |
| A | Y | y | y | y | y | y | y | |
| | Z | z | z | z | z | z | z | |
| B | W | w | w | w | w | w | w | |

What is claimed is:

1. A method of correlation decoding spread spectrum CDMA signals in an order of decoding having a decoding sequence different from a reverse of a spread spectrum CDMA coding sequence of the transmitted signal, said method comprising:

encoding with a spreading code signal prior to transmission with a sequential series of encoding steps $F_1$ through $F_n$;

transmitting the signal through a transmission channel;

receiving the signal from the transmission channel;

decoding the received signal by application of decoding steps of despreading codes with a sequence other than that of the sequential series of encoding steps;

each encoding spreading code has a corresponding decoding despreading code;

spreading and despreading codes are correlation related codes;

decoding the received signal is partial; and such decoding is distributed among several intermediate receiving stations located between an origin and a termination.

2. The method of claim 1 further including:

repeating encoding steps and decoding steps among the intermediate receiving stations.

3. The method of claim 2 further including:

using rates of spreading and despreading different from original spreading frequencies at transmission origin at intermediate and termination stations.

4. The method of claim 3 further including:

multiplexing added channels into the transmission path through coders at the intermediate receiving stations.

5. The method of claim 4 further including:

transmitting via multiple channels each using different sequences of decoding and coding.

* * * * *